United States Patent
Flower et al.

(10) Patent No.: US 8,365,181 B2
(45) Date of Patent: Jan. 29, 2013

(54) METHOD AND SYSTEM FOR GUIDING SCHEDULING DECISIONS IN CLUSTERS OF COMPUTERS USING DYNAMIC JOB PROFILING

(75) Inventors: Richard Flower, Palo Alto, CA (US); Linsey O'Brien, legal representative, Palo Alto, CA (US); Leonidas Kontothanassis, Arlington, MA (US); Rivka Ladin, Newton, MA (US); David Goddeau, Watertown, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3028 days.

(21) Appl. No.: 10/889,598

(22) Filed: Jul. 12, 2004

(65) Prior Publication Data

US 2006/0010449 A1 Jan. 12, 2006

(51) Int. Cl.
*G06F 9/46* (2006.01)
*G06F 15/173* (2006.01)
*G06F 15/16* (2006.01)
(52) U.S. Cl. ......... 718/104; 718/105; 709/226; 709/201
(58) Field of Classification Search ............... 718/1–105; 709/203, 209, 224, 226, 229, 231; 719/201–203, 719/223–226
See application file for complete search history.

(56) References Cited

U.S. PATENT DOCUMENTS 5,774,668 A * 6/1998 Choquier et al. ............. 709/223
6,539,445 B1 * 3/2003 Krum ........................... 710/110
7,185,046 B2 * 2/2007 Ferstl et al. ................... 709/201
2002/0184545 A1 * 12/2002 Oshima et al. ............... 713/321
2007/0220520 A1 * 9/2007 Tajima .......................... 718/104

OTHER PUBLICATIONS

Olaf Arndt, Bernd Freisleben, Thilo Kielmann and Frank Thilo; A comparative study of online scheduling algorithms for networks of workstations; ACM 2000; pp. 95-112.*
Seltzer, M., et al., "The Case for Application-Specific Benchmarking," *Harvard University, Proceedings of the Seventh Workshop on Hot Topics in Operating Systems* (1999), 5 pages.
Cohen, I., et al., "Finding the Key Indicators of SLO State," pp. 1-4: Feb. 20, 2004.
Haldar, S., et al., "An Affinity-Based Dynamic Load Balancing Protocol for Distributed Transaction Processing Systems," *Dept. of Computer Science and Autmomation, Indian Institue of Science, Bangalore 560012, India, Performance Evaluation 17*, pp. 53-71 (1993).
Salvatore, T., et al., "Allocating Data and Operations to Nodes in Distributed Database Design," *IEEECS Transactions on Knowledge and Data Engineering*, 7(2):305-317 (1995).

* cited by examiner

*Primary Examiner* — Abdullah Al Kawsar

(57) ABSTRACT

A method and system for scheduling jobs in a cluster of compute servers using dynamic job profiling improves the overall performance of the computing cluster. Specifically, the method and system monitors the performance of individual compute servers in a cluster, and assigns jobs to particular compute servers based on the most current performance information of the compute servers. As the job profiles of the compute servers change with every job processed, the decision as to which compute server is most appropriate for a particular job will dynamically change. Various scheduling algorithms can be used in connection with the method and system to assign jobs to specific compute servers based on the available information in the job profiles.

16 Claims, 3 Drawing Sheets

METHOD AND SYSTEM FOR GUIDING SCHEDULING DECISIONS IN CLUSTERS OF COMPUTERS USING DYNAMIC JOB PROFILING

BACKGROUND OF THE INVENTION

Clusters of commodity computers are increasingly the platform of choice for running computationally intensive jobs in a variety of industries. Computations ranging from wind-tunnel simulations, gene and protein analysis, drug discovery, and many others are run on commodity computers with increasingly successful results. A typical cluster configuration as in FIG. 1 may comprise a collection of compute servers $110a \ldots n$, connected by a fast commodity network (typically 100 Mbps or 1 Gbps Ethernet), and a smaller number of machines acting as storage servers 120. Users that want to use the system submit jobs through one or more gateway machines 130 that are responsible for providing an interface between the users 140 and the cluster network 100, scheduling work on the cluster machines 110, 120 and returning the results of the jobs to the users.

The roles of machines 110, 120 in such a cluster need not be exclusive and membership of machines in the cluster may be transient or persistent. Most of the work done for such clusters to-date has focused on solving a number of important problems, such as, discovery of idle resources; management of job priorities; dealing with faults and the transient nature of compute servers; and automatic configuration of a smaller cluster out of a pool of resources based on an end-users description of their computational needs.

SUMMARY OF THE INVENTION

The present invention provides a method and system for scheduling jobs in a cluster of compute servers using dynamic job profiling. More specifically, the present invention monitors the performance of individual compute servers in a cluster, and assigns jobs based on the most current performance information of the compute servers.

Compute servers available to end users commonly have disparate characteristics. Disparity can take many forms including varying operating systems and processor architectures which would dictate what kind of executables a particular machine can run. Even in clusters where the operating systems and processor architecture is maintained uniform, other types of heterogeneity emerge as the cluster gets upgraded over time. For example, it is quite common for machines in a cluster to be upgraded piecemeal. Thus, a cluster can end up having compute resources with, among other things, varying processor speeds, disk I/O capabilities, memory sizes, file buffer cache sizes, floating point and integer arithmetic ratings.

An embodiment of the present invention uses existing technologies to monitor and store the job performance of compute servers in the network cluster, and uses the resulting job profile information to assign prospective or candidate jobs to a particular compute server. As the job profiles of the compute servers change with every job processed, the decision as to which compute server is most appropriate for a particular job will dynamically change.

In various embodiments of the present invention, the job scheduler uses different scheduling algorithms to assign jobs based on the available information in the job profiles. These algorithms include, but are not limited to, "greedy algorithms," "competitive algorithms," "affinity scheduling," "reduction algorithms" or "genetic algorithms."

Existing solutions focus on solving other important problems in the context of cluster scheduling, but do not try to learn anything about the properties of the jobs that are submitted to them. As a result they can make quite poor decisions on job placement and cause jobs to run significantly slower than necessary. These existing approaches to job scheduling fail to adequately address the unique opportunities presented by heterogeneous clusters and thus result in suboptimal use of resources in such settings. For example, a search of a DNA fragment against the human genome can take as little as 30 seconds or as much as 190 seconds depending on the amount of currently available memory that a machine has even if the difference between the total (overall) memory sizes of the two machines is no more than 10%. Furthermore, because certain data may already reside in a file buffer or cache, scheduling a job on a machine that has previously run a similar job can result in execution times 4-5 times faster than if jobs are randomly scheduled.

Based on these observations, in a cluster environment, the present invention constantly monitors jobs and takes information about jobs previously executed on the cluster to guide future scheduling decisions. The present invention complements the existing capabilities of cluster scheduling systems (i.e. resource discovery, fault tolerance, etc.), and allows cluster systems to become more intelligent and self directing.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
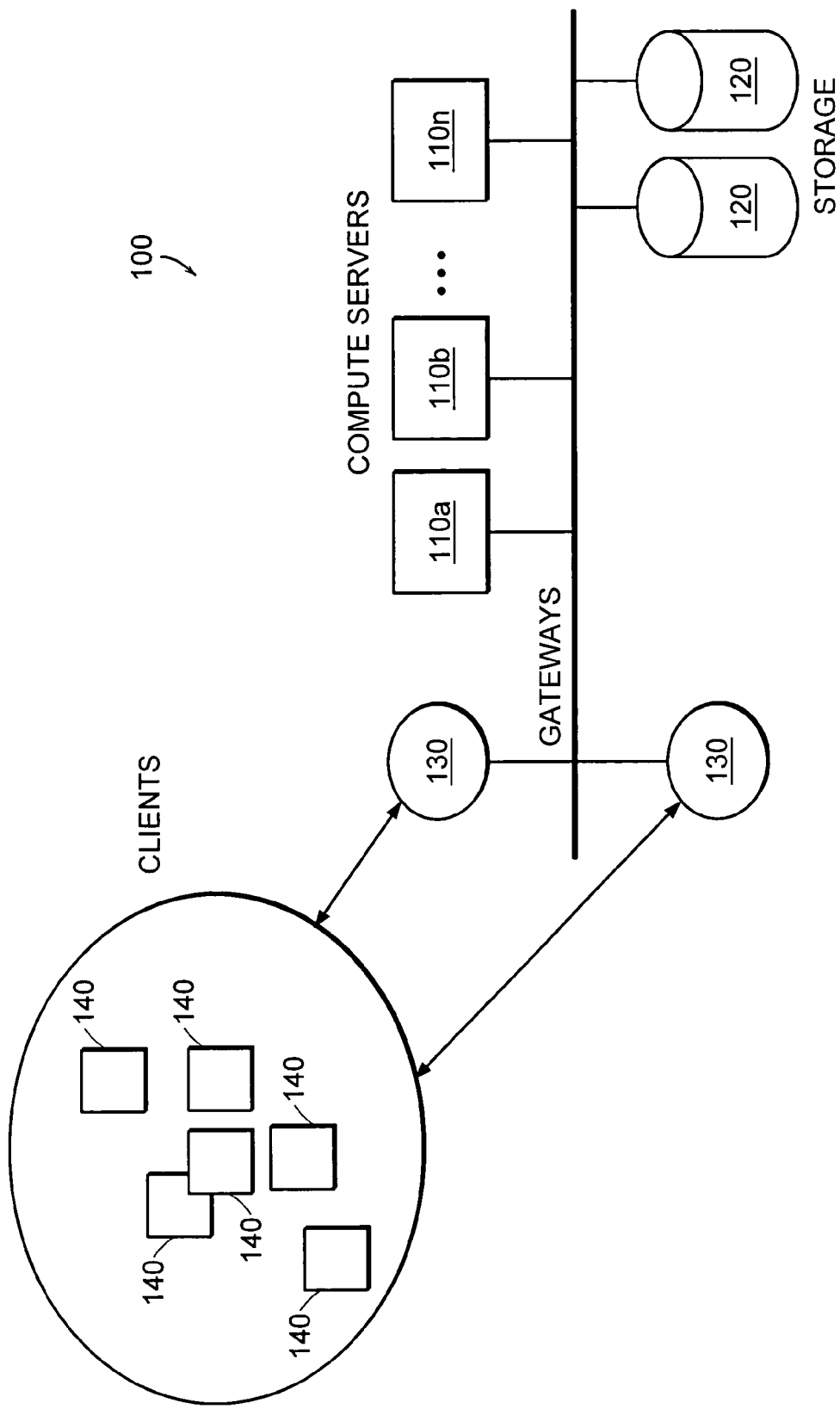
FIG. 1 is a cluster configuration in which the present invention may be employed.
Figure 2:
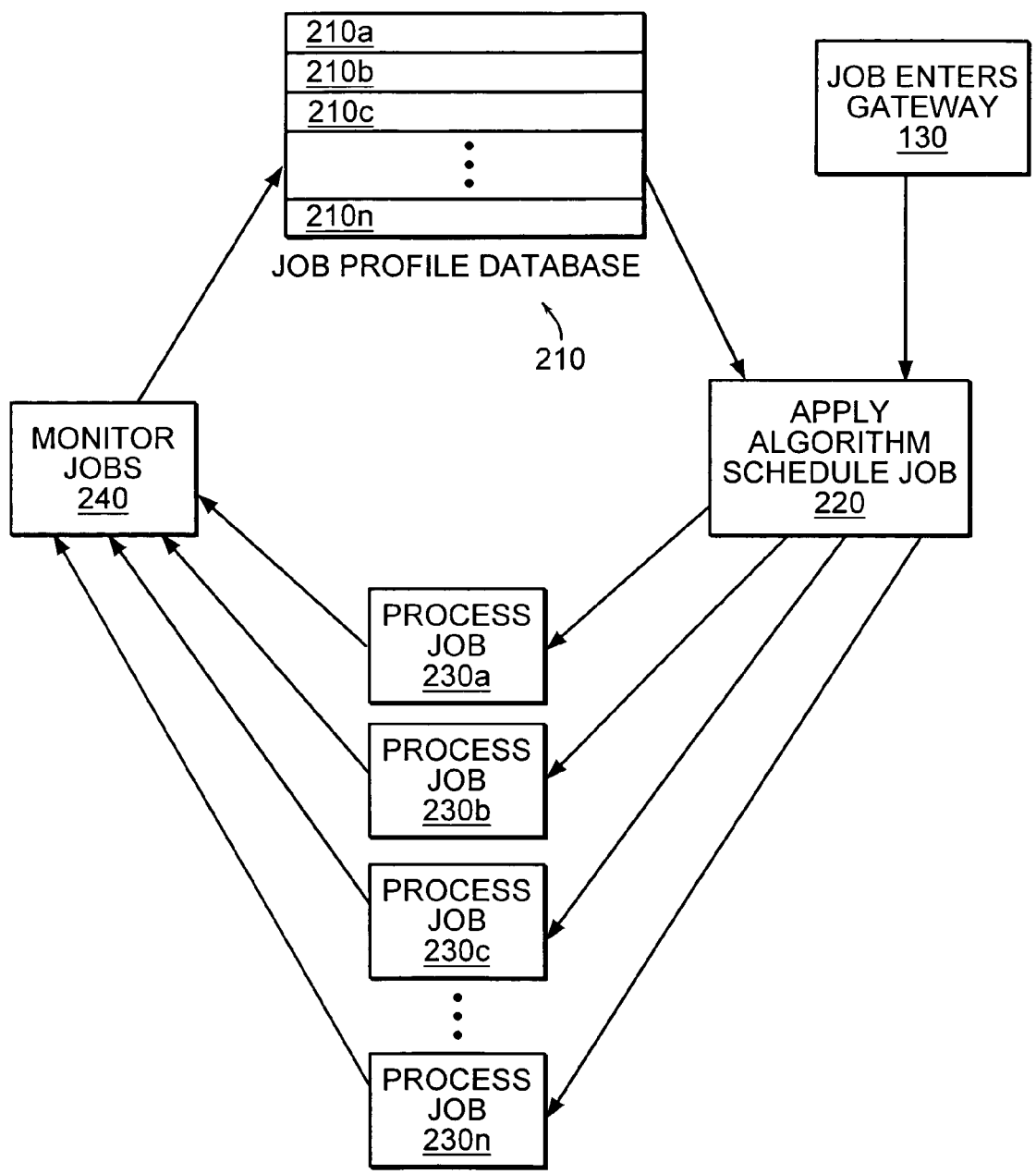
FIG. 2 is a flowchart diagram of the present invention.

FIG. 2 shows a flow chart of an embodiment of the present invention. This embodiment operates in two components. The first component leverages existing technologies to introduce un-intrusive performance monitoring 240 on all compute servers (such as 110 of FIG. 1) of a cluster and storing the gathered information in a job profile database 210. Such monitoring tools already exist and can provide fairly detailed analysis of a job's computational profile with very little overhead (typically less than 5%). Furthermore they require no modifications to the executable being submitted and thus require no changes from an end-user's perspective. Examples of such monitoring tools are VTune® from Intel Corp or "Oprofile" for Linux systems. Other similar monitoring tools may be used at 240 in FIG. 1.

Additional information about a job's characteristics can be collected from a variety of system tools with little or no additional overhead as well. Some of the information collected in a job profile $210a \ldots n$ may include, but is not limited to, the following: files being accessed and amount of I/O per file (in bytes and number of I/O operations or calls), floating point to integer instruction ratio, number of instructions executed, memory working set size, cache working set size, number of bytes collected from disk, and network I/O accesses.

Preferably, for each job the executable's name, the arguments passed to it and the execution profile (i.e. machine type used, cache type, total run time, etc.) as it has been collected by performance monitoring tools is saved in the job profiles $210a \ldots n$. In addition, job profile database 210 stores/records information regarding the characteristic of each machine in the cluster (using a small set of benchmark programs) with respect to its floating point and integer capabilities, its file buffer cache size and type (hot or cold cache, etc.), its memory size, type of disk memory, and the capabilities of its I/O and networking subsystems.

As such, the job profiles $210a \ldots n$ and entries in database 210 provide groupings or categories of jobs based on previously executed jobs. Per job category, there is at least one job profile and a preferred machine according to the recorded statistics and performance information of the previously executed jobs. Restated, the system of the present invention enables each compute server machine 110 to be associated with the job categories and hence the profiles of jobs for which the computer server has most efficiently processed (historically and/or recently). Thus given a candidate job to be scheduled for execution, the job category and/or closest matching job profile of the various job categories represented in database 210 have determined the corresponding preferred machine for executing such jobs (i.e. jobs that fit or match the job profile or that job category of the given job).

The second component 220 of the present invention uses the job profile information and more specifically the job category information held in database 210 to attempt to improve the overall throughput of the cluster by making intelligent job placement decisions. While an exact online solution to the scheduling problem is impossible, reasonable heuristics can be found that can significantly improve throughput. As an example, jobs 230 that access the same large database files with different search patterns can run 4-5 times faster on a machine that has pre-warmed the database file, and therefore it is beneficial to wait for such a machine to become available unless the expected wait time exceeds the difference in expected runtime savings. Depending on the nature of the executable names and arguments of a given candidate job, and also the nature of the capabilities of the cluster network servers (as indicated in the saved information in database 210), a different algorithm can be used by job scheduling module 220 in connection with the dynamically changing job profiles $210a \ldots n$ to optimize performance.

Figure 3:
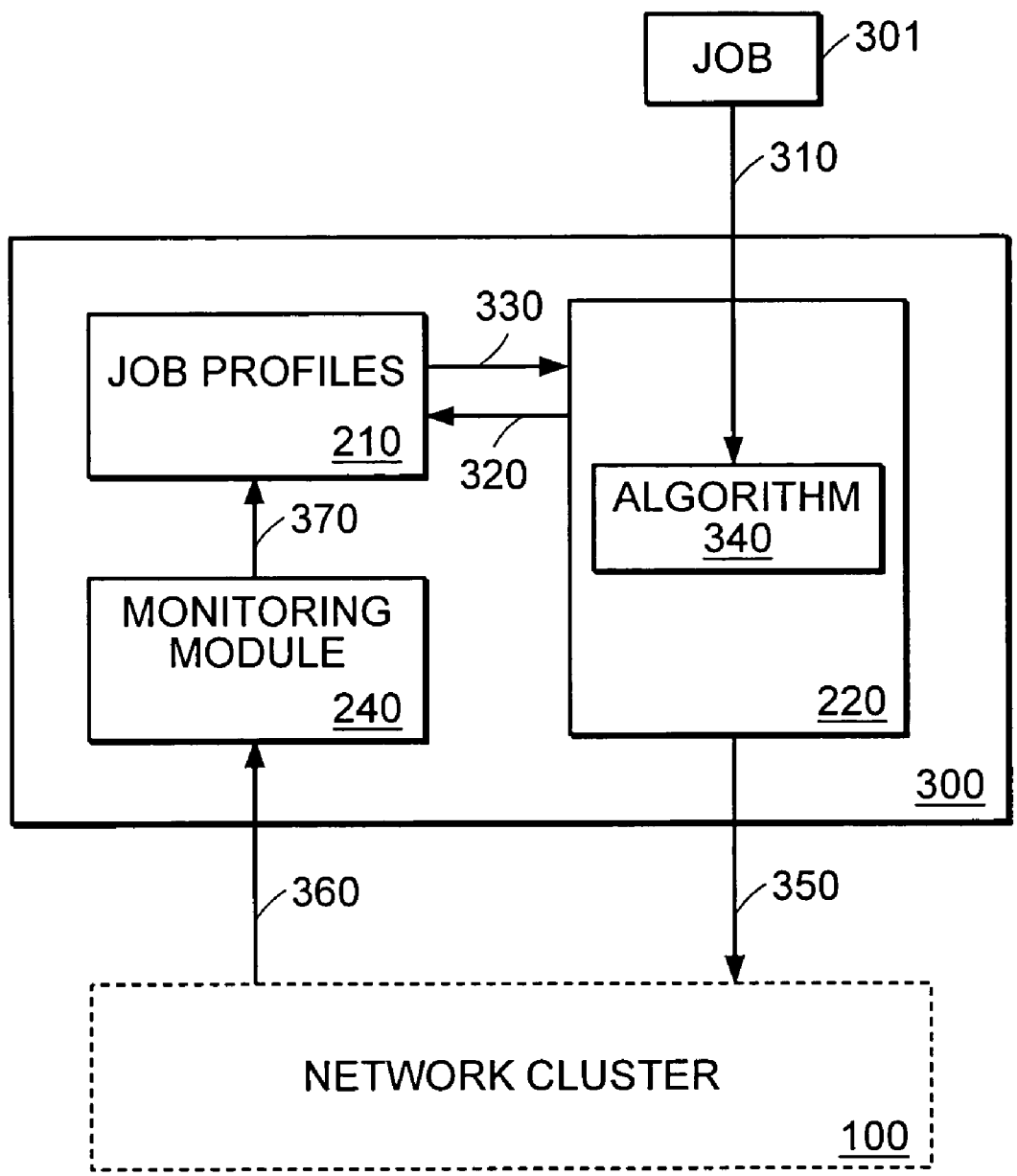
FIG. 3 is a representative diagram of the job scheduler of one embodiment of the present invention.

FIG. 3 provides a representative diagram of such a job scheduler of an embodiment of present invention. A candidate job 301 is provided with the names of a respective executable, arguments, and argument values. When the job 301 gets submitted to the cluster gateway 310, the gateway uses the executable's name as a key into the local database of the invention system 300 in order to look up information 320 for this particular executable. Known or common database query 320 techniques are employed. In addition to determining the closest matching job profile and in turn job category and corresponding preferred compute server, the information returned 330 can be a list of arguments for this executable that have been observed to have a material impact on job execution time in the past. The current values of those arguments are compared with previous values for which the system 300 has accumulated statistics. Furthermore, information can be queried 320 and retrieved 330 on which machines a job with the same executable and similar arguments was last run.

Based on the foregoing query results and retrieval information, an algorithm 340 determines to which compute server to send the job 301. On output 350, the scheduling module 220 places the incoming or candidate job 301 on a machine in the cluster network 100 that either has run a similar job recently or if no such machine exists, on a machine whose resource specification best matches the expected behavior of the incoming job 301. If a suitable machine exists but is currently busy it may still be preferable to wait for that machine to finish its work and schedule the new incoming job 301 there, rather than scheduling it on an already idle machine.

Algorithm 340 may apply affinity scheduling for assigning database transaction or parallel processing. Pseudocode for the algorithm 340 of one embodiment is as follows for purposes of illustration and not limitation.

Given machine M1, Job B (the job type and category last run on M1) and Input Job A (to be scheduled):

$$t_{wait} = \frac{1}{2}[(t_{A,M1,Ccold})-(t_{A,M1,Chot})+(t_{B,M1,Ccold})-(t_{B,M1,Chot})]$$

Where $(t_{A,M1,Ccold})$ is the time Job A takes on M1 when the File Buffer Cache is cold.

Where $(t_{A,M1,Chot})$ is the time Job A takes on M1 when the File Buffer Cache is hot.

Where $(t_{B,M1,Ccold})$ is the time Job B takes on M1 when the File Buffer Cache is cold.

Where $(t_{B,M1,Chot})$ is the time Job B takes on M1 when the File Buffer Cache is hot.

Job A waits $t_{wait}$ to run on M1, otherwise it will schedule Job A to run on another machine.

It is understood that a variety of algorithms 340 of various complexity may be employed. For example, other constraints may be added to the foregoing algorithm 340. In addition, rule based techniques, greedy algorithms, competitive algorithms, M Queue algorithms, and the like may be utilized singularly or in combination.

After the selected machine has processed the candidate job 301, the system 300 updates the job profiles in the job profile database 210 as described above in FIG. 2.

The behavior of the system 300 of the present invention is not static, but varies over time. For example, some jobs may change the state of databases that they are working on and thus the same job with the same argument can have a different runtime the next time it is run. As long as the changes are gradual, the monitoring sub-system/module 240 will detect the differences 360 and update 370 the job profiles $210a \ldots n$ which ultimately adjusts the scheduling policies (at 340 and 220) appropriately. Furthermore to ensure that the scheduling system 300 does not get stuck in suboptimal decisions, small amounts of randomness may be introduced in the scheduling 220 so that new profiles can be collected about jobs even after the jobs have been studied for a long time. The amount of randomness in the scheduling can depend on the history of a job (the more history the less randomness needed), and the relative values of more recent runs versus older runs (i.e. if a new non-random run produces markedly worse runtimes then this is a sign that random scheduling and profile collection are currently needed).

This embodiment of the present invention increases the throughput capacity of a fixed collection of machines 110 given a particular workload. Unlike previous approaches which tend to focus on resource utilization rather than throughput maximization, this embodiment of the present invention, makes the best use of compute resources while focusing on average job turn around time. This approach results in higher productivity from the end-user's perspective, and better return on investment for the IT manager that controls the decisions on computing purchases. Furthermore, a profile drive scheduler can provide a differentiator in what is otherwise a commodity field and make the difference between one vendor's cluster solution versus another.

Embodiments of the present invention involve modifications to the cluster scheduling system 300 that are invisible from an end user's perspective and thus, can be adopted with little or no change in other operational aspects of the system. Furthermore, even in the absence of sufficient information for intelligent decisions, the performance degradation of the system of the present invention over a more traditional schedule is a very modest 3-5% due to our monitoring and profile collection activities. On the other hand, the upside in successful use cases is 4- or 5-fold increase in throughput. Given these tradeoffs, the performance penalty paid in the failure cases is a small price to pay in order to realize the potential gain.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of scheduling a subject job in a cluster of computers comprising:
    storing job profiles of jobs executed by compute servers in the cluster of computers, wherein the job profiles include indications of arguments for a particular executable that have been observed to have a material impact on job execution;
    assigning the subject job to a compute server in the cluster of computers based on the indications of arguments and by using job profile information from the stored job profiles, wherein the job profile information includes one or more of information relating to input/output operations in the jobs, information relating to instructions executed by the compute servers for the jobs, and amount of data collected from storage in the jobs;
    monitoring performance of the compute server processing the subject job; and
    updating the job profiles based on the performance of the compute server.

2. A method of claim 1 wherein the step of assigning employs a greedy algorithm.

3. A method of claim 1 wherein the step of assigning employs a competitive algorithm.

4. A method of claim 1 wherein the step of assigning employs an affinity scheduling algorithm.

5. A method of claim 1 wherein the step of assigning includes introducing a degree of randomness.

6. A computer network system comprising:
    a network cluster of computers including compute servers that process jobs, and storage servers;
    a memory store for storing job profiles of jobs processed by the compute servers, wherein the job profiles include indications of arguments for a particular executable that have been observed to have a material impact on job execution; and
    a processor in communication with the memory store, the processor to:
        assign a subject job to a compute server based on the indications of arguments and by using job profile information from the stored job profiles, wherein the job profile information includes one or more of information relating to input/output operations in the jobs, information relating to instructions executed by the compute servers for the jobs, amount of data collected from storage in the jobs, memory working set sizes of the jobs, and cache working set sizes of the jobs;
        monitor performance of the compute server processing the subject job; and
        update the job profiles based on the monitored performance of the compute server.

7. A computer network system of claim 6 wherein the processor employs a greedy algorithm to assign the subject job to the compute server.

8. A computer network system of claim 6 wherein the processor employs a competitive algorithm to assign the subject job to the compute server.

9. A computer network system of claim 6 wherein the processor employs an affinity scheduling algorithm to assign the subject job to the compute server.

10. A computer network system of claim 6 wherein the processor employs a degree of randomness in assigning the subject job to the compute server.

11. A job scheduler comprising:
    a memory for storing job profiles of compute servers in a cluster of computers, wherein the job profiles include indications of arguments for a particular executable that have been observed to have a material impact on job execution; and
    a processor coupled to the memory, the processor to:
        assign a subject job to a compute server in the cluster of computers based on the indications of arguments and by using job profile information from the stored job profiles, wherein the job profile information includes one or more of information relating to input/output operations in the jobs, information relating to instructions executed by the compute servers for the jobs, and amount of data collected from storage in the jobs;
        monitor performance of the compute server processing the subject job; and
        update the job profiles based on the monitored performance of the compute server.

12. A job scheduler of claim 11 wherein the processor employs a greedy algorithm to assign the subject job to the compute server.

13. A job scheduler of claim 11 wherein the processor employs a competitive algorithm to assign the subject job to the compute server.

14. A job scheduler of claim 11 wherein the processor employs an affinity scheduling to assign the subject job to the compute server.

15. A job scheduler of claim 11 wherein the processor employs a degree of randomness to assign a job to the compute server.

16. A non-transitory computer-readable medium having stored thereon sequences of instructions, the sequences of instructions including instructions, that when executed by a processor, cause the processor to perform scheduling of a subject job, the scheduling comprising:
    storing job profiles of compute servers in a cluster of computers;
    determining, based on the job profiles, whether any one of the compute servers has run a job with a job profile that is similar to a job profile of the subject job;
    in response to determining that a particular one of the compute servers has run a job with a job profile that is similar to the job profile of the subject job, assigning the subject job to the particular compute server;
    in response to determining that none of the compute servers has run a job with a job profile that is similar to the job profile of the subject job, assigning the subject job to one of the compute servers having a resource specification that matches an expected behavior of the subject job;
monitoring performance of the compute server processing the subject job; and
updating the job profiles based on the monitored performance of the compute server.

\* \* \* \* \*